United States Patent Office 2,961,436
Patented Nov. 22, 1960

2,961,436
SOLID, STABLE DIAZONIUM COMPOUNDS

Herbert Kracker and Hans Albert, Offenbach (Main), Germany, assignors to Farbwerke Hoechst Aktiengesellschaft vormals Meister Lucius & Bruning, Frankfurt am Main, Germany, a corporation of Germany No Drawing. Filed Sept. 22, 1958, Ser. No. 762,211

Claims priority, application Germany Sept. 25, 1957

2 Claims. (Cl. 260—141)

The present invention relates to new solid, stable diazonium compounds. In particular, it relates to diazonium compounds corresponding to the following general formula:

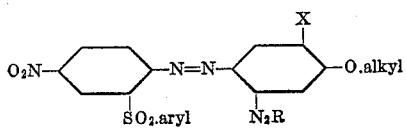

wherein X represents an alkyl or alkoxy group and $N_2R$ represents a diazonium chloride, diazonium sulfate, diazonium phosphate or diazonium chloride-zinc chloride radical.

We have found that solid, stable diazonium compounds are obtained by isolating in known manner in a solid form the diazonium compound from an orthoamino-azo compound of the following general formula:

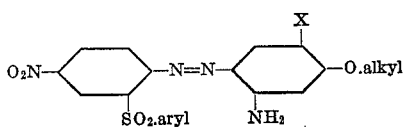

wherein X represents an alkyl or alkoxy group.

The hitherto unknown diazonium compounds are readily soluble in water and in many cases possess a very good stability. The new compounds can be isolated, for example, in the form of diazonium chlorides, diazonium sulfates, diazonium phosphates or diazonium chloride-zinc chloride double salts.

The new diazo-azo compounds can be mixed with the usual standardizing agents and worked up to stable dyeing salts which can be used for the production of valuable water-insoluble azo-dyestuffs on the fiber.

The ortho-amino-azo compounds used as starting materials for the process of the present invention, which in part have not been described in literature, can be obtained by known methods, for example by coupling diazotized 1-amino-4-nitrobenzene-2-arylsulfones with 1-amino-4-alkyl-3-alkoxy-benzenes or 1-amino-3,4-dialkoxybenzenes or their derivatives capable of being coupled, for example, the arylsulfonylamino compounds or N-sulfonic acids, and subsequently splitting off the arylsulfonic acid or the sulfonic acid group.

The following examples serve to illustrate the invention, but they are not intended to limit it thereto, the parts being by weight unless otherwise stated and the relationship of parts by weight to parts by volume being the same as that of the kilogram to the liter:

Example 1

42.6 parts of 2-amino-4-methoxy-5-methyl-2'-phenylsulfonyl-4'-nitro-1,1'-azobenzene, obtainable by coupling diazotized 1-amino-4-nitrobenzene-2-phenylsulfone with the sodium salt of 4-methyl-5-methoxybenzene-1-sulfamic acid and subsequently splitting off the sulfonic acid group, are diazotized at room temperature by introducing them into 142 parts of nitrosylsulfuric acid of 9.3% strength. After diluting the melt with 3500 parts by volume of water at 25° C. and adding 20 parts of kieselguhr, the solution is clarified by filtration. The diazonium sulfate of the amino-azo compound is separated from the filtrate by the addition of 400 parts of sulfuric acid of 95% strength. The diazonium sulfate which may be purified by dissolving it in water with the addition of acetic acid reprecipitating it with sulfuric acid, represents after drying a yellow crystalline powder which is soluble in water and exhibits a good stability at temperatures up to 40° C.

In the same manner, the following amino-azo compounds can be converted into their diazonium sulfates, which likewise possess a good stability:

2 - amino - 4 - ethoxy - 5 - methyl - 2' - phenylsulfonyl-4' - nitro - 1,1' - azobenzene, 2 - amino - 4 - methoxy - 5 - ethyl - 2' - phenylsulfonyl-4' - nitro - 1,1' - azobenzene.

Example 2

44.2 parts of 2-amino-4,5-dimethoxy-2'-phenylsulfonyl-4'-nitro-1,1'-azobenzene, obtainable by coupling diazotized 1-amino-4-nitrobenzene-2-phenylsulfone with the sodium salt of 4,5-dimethoxybenzene-1-sulfamic acid and subsequently splitting off the sulfonic acid group, are converted into the sulfate with 750 parts of sulfuric acid of 60% strength and diazotized at room temperature with 35 parts of nitrocylsulfuric acid of 42% strength. The orange-colored diazonium sulfate which separates is suction-filtered after the addition of 600 parts by volume of ice water, and dried. The product so obtained represents a powder which is soluble in water and exhibits a good stability at temperatures up to 40° C.

Example 3

47 parts of 2-amino-4,5-diethoxy-2'-phenylsulfonyl-4'-nitro-1,1'-azobenzene, if desired after recrystallization from chlorobenzene, are converted into the sulfate with 600 parts of sulfuric acid of 60% strength and after dilution with 800 parts by volume of water, diazotized in the usual manner at 30–35° C. with an aqueous solution of 10 parts of sodium nitrite. The orange colored diazonium sulfate of the amino-azo compound which has separated is suction-filtered and dried at moderate temperature. The product so obtained represents a powder which is soluble in water and exhibits a good stability at temperatures up to 40° C.

Example 4

46 parts of 2-amino-4-methoxy-5-methyl-2'-(4''-chlorophenylsulfonyl)-4'-nitro-1,1'-azobenzene, obtainable by coupling diazotized 1-amino-4-nitrobenzene-2-(4'-chlorophenylsulfone) with the sodium salt of 4-methyl-5-methoxybenzene-1-sulfamic acid and subsequently splitting off the sulfonic acid group, are stirred with 800 parts by volume of hydrochloric acid of 25% strength and diazotized in the usual manner at 30° C. with an aqueous solution of 10 parts of sodium nitrite. After 2 hours the mixture is diluted with 3000 parts by volume of water, and after the addition of 20 parts of kieselguhr the diazo-solution is clarified by filtration. From the solution so obtained the diazonium chloride-zinc chloride double salt of the amino-azo compound is separated by the addition of 7 parts of zinc chloride dissolved in a small amount of water, the separation being completed by the addition of 400 parts of sodium chloride. The yellow-brown precipitate is suction-filtered and dried at moderate temperature. The product so obtained is a powder which is soluble in water and exhibits a good stability at temperatures up to 40° C.

In the same manner the following amino-azo compounds can be converted into their diazonium chloride-zinc chloride double salts, which likewise possess a good stability:

2 - amino - 4 - ethoxy - 5 - methyl - 2' - (4'' - chlorophenylsulfonyl) - 4' - nitro - 1,1' - azobenzene,
2 - amino - 4 - methoxy - 5 - ethyl - 2' - (4'' - chlorophenylsulfonyl) - 4' - nitro - 1,1' - azobenzene,
2 - amino - 4,5 - dimethoxy - 2' - (4'' - chlorophenylsulfonyl) - 4' - nitro - 1,1' - azobenzene.

Obviously many modifications and variations of the present invention are possible in the light of the above teachings. It is, therefore, to be understood that within the scope of the appended claims the invention may be practiced otherwise than as specifically described.

We claim:

1. The solid, stable diazonium compound corresponding to the following formula

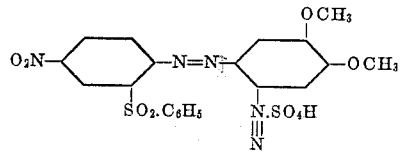

2. The solid, stable diazonium compound corresponding to the following formula

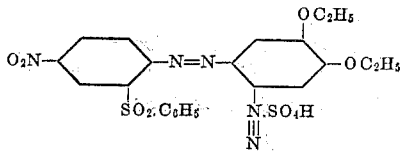

References Cited in the file of this patent
UNITED STATES PATENTS

| | | |
|---|---|---|
| 2,105,919 | Hoffa et al. | Jan. 18, 1938 |
| 2,707,181 | Stanley et al. | Apr. 26, 1955 |

OTHER REFERENCES

Venkataraman: "Synthetic Dyes," 1952, pages 223 and 224.